(12) United States Patent
Pichumani et al.

(10) Patent No.: US 9,100,201 B1
(45) Date of Patent: Aug. 4, 2015

(54) INTER-SITE PIM-DENSE MODE AND PIM-BSR SUPPORT FOR MPLS/BGP IP VPNS

(75) Inventors: Swaminathan Pichumani, San Jose, CA (US); Rahul Aggarwal, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1603 days.

(21) Appl. No.: 12/539,414

(22) Filed: Aug. 11, 2009

(51) Int. Cl.
H04L 12/28 (2006.01)
H04L 12/18 (2006.01)
H04L 12/761 (2013.01)
H04L 12/931 (2013.01)

(52) U.S. Cl.
CPC .............. H04L 12/185 (2013.01); H04L 45/16 (2013.01); H04L 49/354 (2013.01)

(58) Field of Classification Search
CPC ....... H04L 12/185; H04L 45/00; H04L 45/16; H04L 49/201; H04L 49/354
USPC .......................................... 370/256, 390, 397
See application file for complete search history.

(56) References Cited

U.S. PATENT DOCUMENTS

| | | | |
|---|---|---|---|
| 7,444,422 B1 * | 10/2008 | Li .................................. | 709/238 |
| 7,522,599 B1 | 4/2009 | Aggarwal et al. | |
| 7,522,600 B1 | 4/2009 | Aggarwal et al. | |
| 7,558,263 B1 | 7/2009 | Aggarwal et al. | |
| 7,564,806 B1 | 7/2009 | Aggarwal et al. | |
| 7,570,605 B1 | 8/2009 | Aggarwal et al. | |
| 7,924,837 B1 * | 4/2011 | Shabtay et al. ............... | 370/392 |
| 7,925,778 B1 * | 4/2011 | Wijnands et al. ............. | 709/238 |
| 2003/0165140 A1 * | 9/2003 | Tang et al. .................... | 370/393 |
| 2004/0030804 A1 * | 2/2004 | Wiget et al. ................... | 709/245 |
| 2007/0091891 A1 * | 4/2007 | Zwiebel et al. ............... | 370/390 |
| 2008/0101360 A1 * | 5/2008 | Napierala ...................... | 370/390 |
| 2008/0298360 A1 * | 12/2008 | Wijnands et al. ............. | 370/389 |

OTHER PUBLICATIONS

N. Bhaskar, "RFC 5059: Bootstrap Router Mechanism for Protocol Independent Multicast," Jan. 2008, pp. 3-33.*
Rosen et al., "Multicast in MPLS/BGP IP VPNs," Network Working Group IETF, Mar. 5, 2009, 97 pp.
Adams et al., "Protocol Independent Multicast—Dense Mode (PIM-OM): Protocol Specification (Revised)," Network Working Group RFC 3973, Jan. 2005, 57 pp.

(Continued)

*Primary Examiner* — Man Phan
*Assistant Examiner* — Ryan Kavleski
(74) *Attorney, Agent, or Firm* — Shumaker & Sieffert, P.A.

(57) ABSTRACT

Techniques are described for supporting PIM (Protocol Independent Multicast) Dense Mode (PIM-DM) and PIM Bootstrap Router (PIM-BSR) between different VPN sites of an IP VPN. A system includes a plurality of customer sites connected to a service provider network by provider edge (PE) routers that provide an IP VPN. A first one of the PE routers receives multicast traffic from a first one of the customer sites, wherein the multicast traffic is PIM (Protocol Independent Multicast) Dense Mode (PIM-DM) traffic for which no PIM join messages have been received by the first PE router from the other PE routers via BGP messages. A tunnel setup module of the first PE router is configured to automatically signal a provider tunnel through the service provider network upon receiving the PIM-DM multicast traffic without maintaining multicast state data for a multicast group associated with the PIM-DM multicast traffic.

18 Claims, 5 Drawing Sheets

(56) References Cited

OTHER PUBLICATIONS

Bhaskar et al., "Bootstrap Router (BSR) Mechanism for Protocol Independent Multicast (PIM)," Network Working Group RFC 5059, Jan. 2008, 38 pp.

Rosen et al., "BGP/MPLS IP Virtual Private Networks (VPNs)," Network Working Group RFC 4364, Feb. 2006, 48 pp.

Rosen et al., "BGP/MPLS VPNs," Network Working Group RFC 2547, Mar. 1999, 24 pp.

U.S. Appl. No. 11/213,638, entitled "Shared Multicast Trees for Multicast Virtual Private Networks," filed Aug. 26, 2005.

* cited by examiner

INTER-SITE PIM-DENSE MODE AND PIM-BSR SUPPORT FOR MPLS/BGP IP VPNS

TECHNICAL FIELD

The invention relates to computer networks and, more particularly, to virtual private networks (VPNs) established over computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

Virtual private networks (VPNs) are often used to securely share data over a public network, such as the Internet. For example, an enterprise that includes multiple geographically separated sites, each site including one or more computing devices, may establish a VPN to allow the computing devices to securely communicate through the Internet or another public network. As one example, VPNs encapsulate and transport layer three (L3) communications, such as Internet Protocol (IP) packets, between the remote sites via the public network.

One form of a VPN is a "BGP/MPLS IP VPN." In a BGP/MPLS IP VPN, a plurality of customer sites are connected by an IP backbone network provided by a service provider. Data packets are tunneled through the backbone, so that core routers within the backbone do not need to know the VPN routes associated with the customer sites. One form of tunnel that is commonly used within the service provider backbone to carry the customer data is MPLS label switched paths (LSPs). Other tunnels that may be used to carry the customer data include IP/GRE (internet protocol/generic routing encapsulation) tunnels.

In BGP/MPLS IP VPNs, routing information for a particular VPN is maintained only by the Provider Edge routers (the PE routers", or "PEs") of the IP backbone that attach directly to customer sites of that VPN. That is, customer edge routers (CE routers) within the customer sites send their VPN routes to the adjacent PE routers, typically using an Interior Gateway Protocol (IGP), such as Open Shortest Path Protocol (OSPF) or an Exterior Gateway Protocol such as Exterior Border Gateway Protocol (eBGP). The service provider's PE routers then propagate the VPN routes, called VPN routing and forwarding (VRF) to PE peers through peering sessions using Interior BGP (iBGP). That is, the PE routers exchange iBGP messages through the IP backbone via peering sessions to propagate the VPN routes learned from the CE routers. In this way, core routers within the IP backbone are unaware of the VPN routes for the various VPNs that make use of the backbone network. Further details of BGP/MPLS IP VPNs are described in Request for Comment (RFC) 4364, "BGP/MPLS IP Virtual Private Networks (VPNs)," Internet Engineering Task Force, February 2006, the entire contents of which are incorporated herein by reference.

In some cases, a VPN may be configured to carry L3 multicast traffic, such as Internet Protocol Television (IPTV), desktop conferences, corporate broadcasts, music and video web casts, and other forms of multimedia content. If a particular BGP/MPLS IP VPN is transmitting "native" multicast traffic over the backbone, it is referred to as a Multicast VPNs (MVPNs). "Native" multicast traffic typically refers to packets that a CE sends to a PE in which the IP destination address of the packets is a multicast group address, or the packets are multicast control packets (e.g., join messages) addressed to the PE router itself, or the packets are IP multicast data packets encapsulated in MPLS. Further details of MVPNs are described in Internet Draft, DRAFT-IETF-L3VPN-2547BIS-MCAST-08, "Multicast in MPLS/BGP IP VPNs," Internet Engineering Task Force, Mar. 5, 2009, the entire contents of which are incorporated herein by reference.

While RFC 2547 describes a model for multicast in BGP/MPLS IP VPNs, it only describes support for certain multicast routing protocols. As a result, various features of multicast routing protocols are not yet supported.

SUMMARY

In general, techniques are described for supporting PIM (Protocol Independent Multicast) Dense Mode (PIM-DM) between different virtual private network (VPN) sites of an Internet Protocol (IP) VPN, such as a multiprotocol label switching/border gateway protocol VPN (MPLS/BGP). PIM-DM is a multicast routing protocol in which multicast datagrams are flooded to all multicast routers within a local PIM-DM domain without expressly exchanging multicast control messages (e.g., multicast join and leave messages) for individual multicast groups. This allows the PIM-enabled devices within a local network to avoid maintaining state data that lists the current receivers for each multicast group until a source starts to transmit data for that multicast group, where a group is defined as a combination of a multicast source (S) and a multicast group identifier (G). Use of PIM-DM as a routing protocol may be useful, for example, when a network has a large number of individual multicast sources and receivers. This disclosure describes techniques by which PE routers of a service provider network are able to extend a PIM-DM domain to span the service provider network by way of the BGP/MPLS IP VPN so that the PIM-DM domain encompasses all of the customer sites of the VPN.

In addition, techniques are described for supporting Bootstrap Router (BSR), which is a mechanism for the class of multicast routing protocols in the PIM family that use the concept of a Rendezvous Point as a means for receivers to discover the sources that send to a particular multicast group (RFC 5059). This disclosure describes techniques by which PIM-BSR is extended to span the service provider network so that all PIM-BSR enabled devices within the customer sites may participate in the Bootstrap Router process.

In one embodiment, a method comprises receiving multicast traffic with a first provide edge (PE) router of a service provider network. A first PE router is connected to a first customer site and is a member of an IP VPN provided by the service provider network. The multicast traffic is PIM-DM traffic for which no PIM join control messages have been received by the first PE router from other PE routers of the service provider network. The method includes, when the first PE router is configured to support the PIM-DM multicast traffic, automatically signaling a tunnel to transport the PIM-DM multicast traffic through the provider network even though no PIM join control message have been received by the first PE router. The method further includes encapsulating the PIM-DM multicast traffic with the first network device to form encapsulated packets, and forwarding the encapsulated packets within the tunnel to every other PE routers connected to the VPN.

In another embodiment, a method of forwarding PIM-DM multicast traffic within an IP VPN comprising receiving multicast traffic with a first PE router of a service provider network. The multicast traffic is PIM-DM multicast traffic associated with a multicast group for which no PIM join requests have been received by the first PE router. The method further comprises determining a source network address and the multicast group (<S,G>) for the PIM-DM multicast data traffic, and determining whether the <S,G> for the PIM-DM multicast traffic has been designated for transport through the service provider network via a selective tunnel. The method further comprises, when the <S,G> for the PIM-DM multicast traffic has been designated for transport through the service provider network via a selective tunnel and a selective service provider tunnel has not been established for the <S.G> of the PIM-DM traffic, automatically signaling a tunnel through the provider network to transport the PIM-DM multicast traffic even though no PIM join control message have been received by the first PE router for the <S,G> and forwarding the PIM-DM multicast traffic with the tunnel. The method further comprises, when the <S,G> for the PIM-DM multicast traffic has not been designated for transport through the service provider network via a selective tunnel, forwarding the PIM-DM multicast traffic through an inclusive service provider tunnel.

In another embodiment, a method comprises receiving, with a first PE router, PIM Bootstrap Messages (PIM-BSMs) associated with discovery of a multicast group, wherein the first PE router is connected to a first customer site and is a member of an IP VPN provided by the service provider network. The method includes processing the PIM-BSMs with a control plane of the first PE router to update state data associated with a PIM Bootstrap Router (PIM-BSR), and generating second PIM-BSMs with the control plane of the first PE router based on the updated state data associated with the PIM-BSR. The method further includes automatically signaling a selective service provider tunnel through the provider network to transport the second PIM-BSMs for the IP VPN, and forwarding the PIM-BSMs through the service provider network with the selective service provider tunnel.

In another embodiment, a router comprises a set of input interfaces that receive multicast traffic from a first customer site of an IP VPN. The multicast traffic is PIM (Protocol Independent Multicast) Dense Mode (PIM-DM) traffic for which no PIM join requests have been received by the router from other PE routers within the IP VPN. The router includes a control unit having a tunnel setup module that is configured to automatically signal a tunnel through a service provider network upon receiving the PIM-DM multicast traffic without having previously received multicast join requests for a multicast group associated with the PIM-DM multicast traffic. The control unit encapsulates the PIM-DM multicast traffic to form encapsulated packets and forwards the encapsulated packets within the tunnel to a second PE router connected to a second customer site of the VPN.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
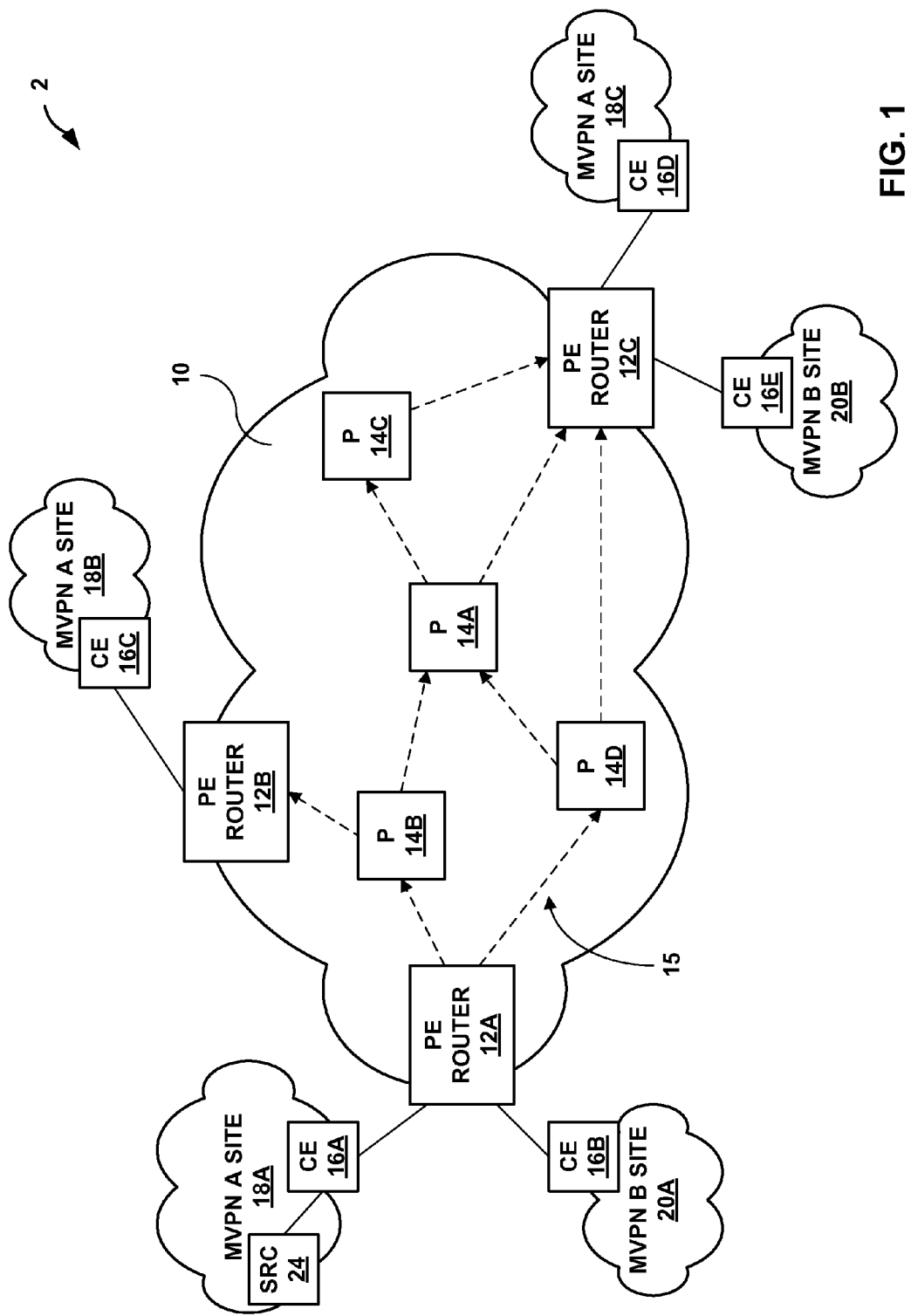
FIG. 1 is a block diagram illustrating an example service provider (SP) network in which provider edge (PE) routers support PIM (Protocol Independent Multicast) Dense Mode (PIM-DM) between different VPN sites of a MPLS/BGP IP VPNs.

FIG. 1 is a block diagram illustrating an example computer network 2 having a service provider (SP) network 10 in which provider edge (PE) routers 12A-12C ("PE routers 12") support at least one multicast virtual private network (MVPN). In the illustrated embodiment, PE router 12A sets up a multicast tree 15 across the SP network 10 to provide layer three (L3) multicast service between PE routers 12. For example, multicast tree 15 may include one or more service provider tunnels that transport L3 multicast traffic from a multicast source 24 to subscriber devices (receivers) within at least one of the customer sites 18B, 18C of MVPN A. In this regard, PE router 12A operates as an ingress to the service provider tunnels and PE routers 12B, 12C operate as egress routers. Similarly, PE router 12A may use service provider tunnels to transport multicast traffic from sources within MVPN B site 20A to receivers in MVPN site 20B. In other embodiments, multicast trees may be setup by any one of PE routers 12.

In some cases, SP network 10 may comprise a multi-protocol label switching (MPLS) network. Each of the MVPN sites may include a local area network (LAN) or a wide area network (WAN) that comprises a plurality of subscriber devices, such as desktop computers, laptops, workstations, PDAs, wireless devices, network-ready appliances, file servers, print servers or other devices.

Each of PE routers 12 couples to one or more of the MVPN sites via customer edge (CE) routers 16A-16E ("CE routers 16"). For example, PE router 12A is coupled to MVPN A site 18A and MVPN B site 20A via CE router 16A and CE router 16B, respectively. PE router 12B is coupled to MVPN A site 18B via CE router 16C. PE router 12C is coupled to MVPN A site 18C and MVPN B site 20B via CE router 16D and CE router 16E, respectively. Multicast tree 15 couples PE routers 12 to each other via provider (P) routers 14A-14D ("P routers 14"), which represent core routers within SP network 10.

In the illustrated embodiment, MVPN A and MVPN B established across SP network 10 are capable of carrying high bandwidth multicast traffic with increased scalability. For example, MVPN A and MVPN B may carry L3 multicast traffic, such as Internet Protocol Television (IPTV), desktop conferences, corporate broadcasts, music and video web casts, and other forms of multimedia content, from multicast source 24 to subscriber devices within the MVPN A sites and the MVPN B sites.

In one embodiment, each of PE routers 12 includes virtual routing and forwarding (VRF) (not shown) for each MVPN to which it has membership. PE routers 12 advertise their MVPN membership, i.e., the VRFs configured for multicast, to the other PE routers 12 using the border gateway protocol (BGP). In this way, each of PE routers 12 in SP network 10 have a complete view of the MVPN memberships of the other PE routers.

PE router 12A may set up multicast tree 15 across SP network 10 to transport customer multicast data with one of a variety of tunneling technologies, without impacting the procedures for exchange of MVPN routing information. For example, multicast tree 15 may be setup by PE router 12A using PIM or non-PIM protocols, such as MPLS protocols. MPLS protocols include the label distribution protocol (LDP) and the resource reservation protocol (RSVP), which may be extended to include traffic engineering (TE). In the case of PE router 12A using RSVP-TE, multicast tree 15 may comprise a point-to-multipoint (P2MP) label switched path (LSP). Further details regarding the use of P2MP LSPs for MVPNs are described in "Multicast Data Trees For Multicast Virtual Private Networks," by Rahul Aggarwal, Yakov Rekhter and Anil Lohiya, U.S. Pat. No. 7,564,806, the entire contents of which are incorporated herein by reference.

In the example of FIG. 1, CE routers 16 and other routers within the MVPN customer sites 18, 20 use PIM (Protocol Independent Multicast) Dense Mode (PIM-DM) as a multicast routing protocol to control the distribution of multicast data from sources to receivers. For example, CE 16A exchanges initial PIM-DM control messages with other devices within MVPN A SITE 18A as well as with PE router 12A to construct shortest path trees for flooding multicast packets received from SRC 24 within a PIM-DM domain. CE 16A and other PIM-enabled devices within MVPN A flood the multicast packets within MVPN A site 18A without expressly exchanging multicast control messages (e.g., multicast join and leave messages) for individual multicast groups. This allows the PIM-enabled devices within MVPN A to avoid maintaining state data that lists the interested receivers for each multicast group. Such a configuration may be useful, for example, when a network has a large number of multicast sources and receivers. This disclosure describes techniques by which PE routers are able extend a PIM-DM domain over the service provider network 10 by way of the BGP/MPLS IP VPN. For example, the techniques may be applied by PE routers 12 to extend the PIM-DM domain for MVPN A to encompass all of MVPN A SITES 18A, 18B and 18C, thereby allowing PIM-DM multicast packets to be flooded between sites without requiring that the PE routers exchange PIM join messages via BGP packets or maintain multicast state for specific receivers in the various sites. Similarly, PE routers 12 may apply the techniques to extend the PIM-DM domain for MVPN B to encompass all of MVPN B SITES 20A and 20B. This is in contrast to networks that support PIM sparse mode (PIM-SM) in which receivers issue express PIM join and leave requests for individual multicast groups. Further details of PIM-DM are described in RFC 3973, "Protocol Independent Multicast—Dense Mode (PIM-DM)," Internet Engineering Task Force, January 2005, the entire contents of which are incorporated herein by reference. Further details on PM-SM are described in RFC 4601, "Protocol Independent Multicast-Sparse Mode (PIM-SM): Protocol Specification", August 2006, the entire contents of which are incorporated herein by reference.

Figure 2:
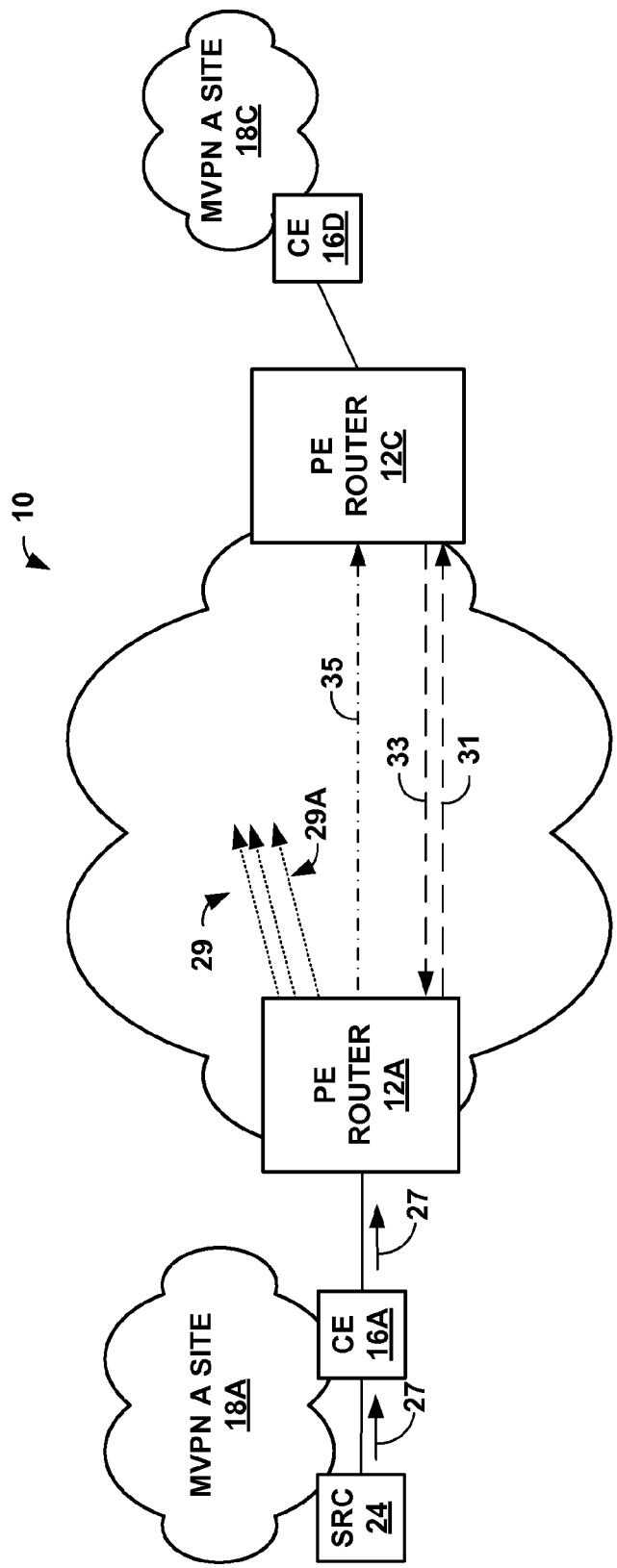
FIG. 2 is a block diagram illustrating a portion of the computer network of FIG. 1 in further detail when supporting PIM-DM multicast traffic over the MPLS/BGP IP VPN.

FIG. 2 illustrates a portion of computer network 2 of FIG. 1 in further detail when supporting PIM-DM multicast traffic over a MPLS/BGP IP VPN. For ease of illustration, FIG. 2 depicts interaction of PE routers 12A and 12C of SP network 10 with respect to MVNP A, although it is understood that the principles described herein can be implemented by other PE routers (12B, for example) and with respect to multiple MVPNs. In this example, source 24 outputs multicast data 27 for a particular multicast group <S,G> to be flooded within the PIM-DM domain. Since CE router 16A is configured to use PIM-Dense Mode (PIM-DM), CE router 16A floods the multicast data 27 on all links, including the link facing PE router 12A. PE router 12A utilizes the techniques described herein to extend the PIM-DM domain through MPLS/BGP VPN provided by service provider network 10.

For example, upon receiving multicast data 27, PE router 12 determines the source address and the associated multicast group (<S,G>), and determines whether a particular one of "selective" service provider tunnels 29 has already been established through SP network 10 for forwarding multicast data the specific <S,G>. If not, the PE router determines whether a selective service provider tunnel has been defined for the multicast group <S,G> but not yet established, .e.g., by way of configuration information on PE router 12A. If so, since PE router 12A has been configured to support PIM-DM, PE router 12A automatically outputs an advertisement 31 within service provider network to initiate the establishment of a selective tunnel for delivery of the multicast data even though no explicit join message for that <S,G> have necessarily been received from any of the other PE routers. That is, as MVPN A sites are internally configured to support PIM-DM, it is likely the case no PE routers of VPN A received PIM join messages from the corresponding CE routers to which they are attached and, therefore, that the PE routers of VPN A have not output any BGP messages carrying any PIM join messages to expressly request delivery of the multicast data 27 for the <S,G>. Nevertheless, to support PIM-DM, PE router 12A automatically initiates establishment of a selective service provider tunnel for flooding the multicast data when the <S,G> has been designated for a selective tunnel, e.g., by an administrator.

In one example, advertisement 31 initiates a selective provider multicast service interface (SPMSI) within service provider network 10 and specifies the particular <S,G> to be associated with the SPMSI. A selective PMSI defined in DRAFT-IETF-L3VPN-2547BIS-MCAST-08 is a service provider mechanism (e.g., a P2MP tunnel) in which a given PE in an MVPN (PE 12A of MVPN A in this example) can send multicast data and be assured that the data will be received by a subset of the other PEs of that MVPN, i.e., only those that have expressly requested delivery of multicast data for the particular <S,G>. However, as PEs 12 are configured to support PIM-DM in accordance with the principles herein, all egress PE routers (e.g., PE router 12C) in the MVPN A join the SPMSI advertised by ingress PE 12 for the PIM-DM group to receive the data without regard to any PIM state maintained by the PE routers, i.e., even though no PIM join messages have been received from their respective CE routers. As a result, an egress PE router joins the SPMSI without having previously received any multicast state for that group, i.e., without having received any c-multicast control messages for the group. For example, even though PE router 12C may not have received any specific PIM join messages from CE 16D for the <S,G> being advertised, PE router 12C nevertheless joins the SPMSI being signaled by PE 12A by outputting any control plane signals 33 that are necessary to join the provider tunnel. The particular control plane signals 33 are a function of the underlying tunneling technology (e.g., P2MP LSPs) being used to transport the multicast data through the provider network 10 and may not be required. Similarly, all other PE routers that are members of MVPN A also automatically join the SMPSI being signaled for the particular <S,G> even though they may not have received any PIM join messages for the <S,G> from the CE routers of their site. Once the selective service provider tunnel is established (e.g., 29A in FIG. 2), ingress PE router 12A forwards the PIM-DM multicast traffic 27 on the selective provider tunnel 27A which will be received by other PE routers in the MVPN.

In some cases, PE router 12A may determine that the multicast group <S,G> has not been marked by the administrator as requiring a selective service provider tunnel. In this case, PE router 12A floods multicast data 27 onto an "inclusive" provider tunnel 35 that has been configured as a default tunnel for the particular MPVN. For example, inclusive provider tunnel 35 is a tunnel that enables a PE attaching to a particular MVPN to transmit a message such that it will be received by every other PE attaching to that same MVPN. For example, inclusive provider tunnel 35 may be a P2MP LSP having an ingress at PE 12A and egresses at each PE that are members of MVPN A, including PE 12C in FIG. 2. Moreover, inclusive provider tunnel 35 may be used to carry multicast data without regard to any specific <S,G> and may be viewed as a default transport for the MVPN. As PE router 12A is configured to support PIM-DM, PE router 12A floods PIM-DM multicast traffic 27 onto inclusive provider tunnel 35 without regard to any c-multicast state for that group, i.e., without having necessarily received any c-multicast control messages for the group. That is, regardless of whether PE router 12A has not received any BGP messages carrying PIM join requests for the particular <S,G> for multicast data 27, PE router 12A nevertheless floods the multicast traffic 27 onto inclusive provider tunnel 35 to support PIM-DM.

All egress PE routers (e.g., PE routers 12B, 12C), upon receiving the PIM-DM multicast traffic 27 on the provider tunnel, forward the multicast traffic data on all of their CE interfaces that are configured in PIM-DM. In this way, PE routers 12 build a data path from the source 12 to receiving customer devices and thereby extend the PIM-DM domain over the service provider network 10 by way of the BGP/MPLS IP VPN without requiring express PIM join requests either within the customer sites or within the service provider network by way of BGP.

Figure 3:
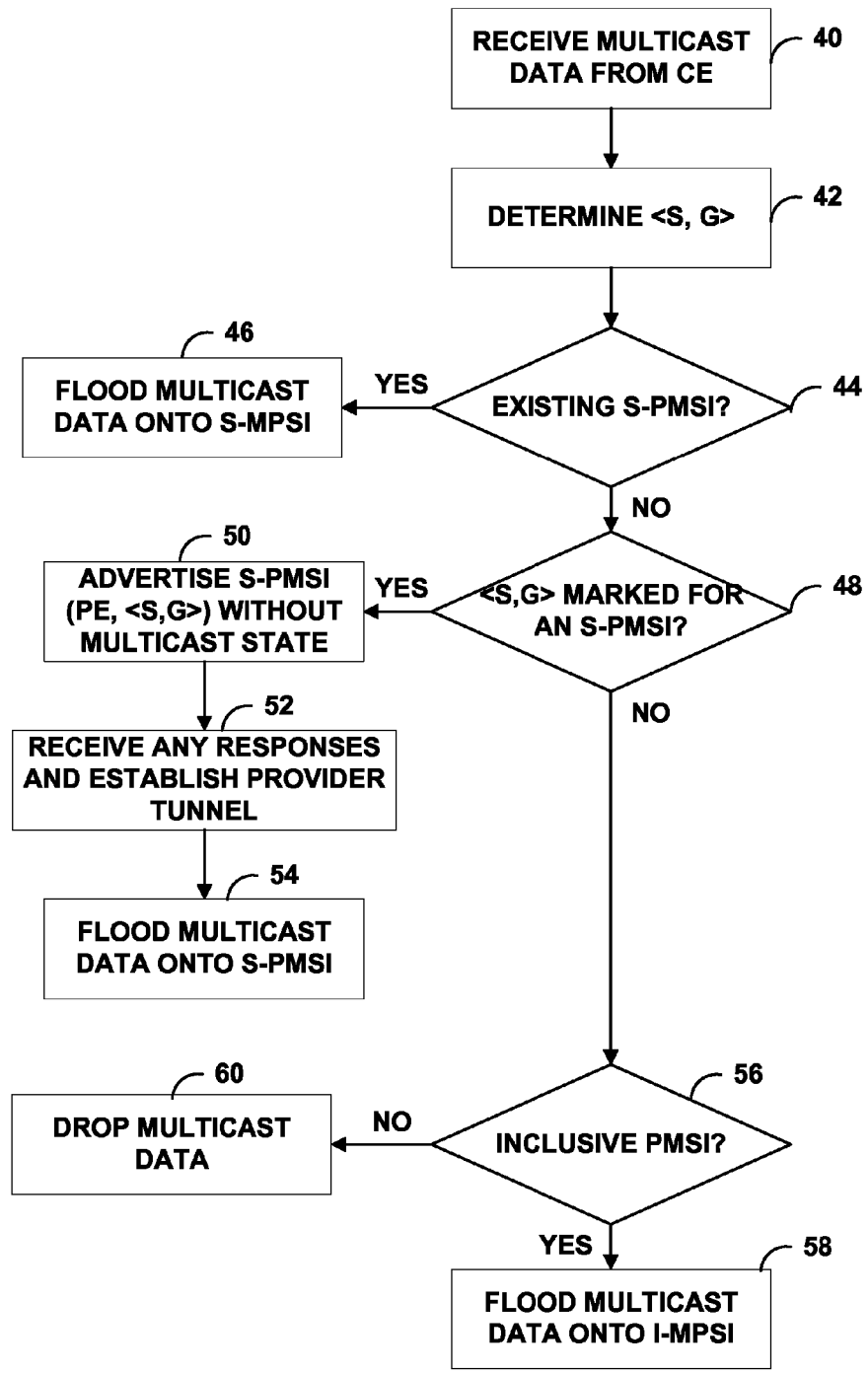
FIG. 3 is a flowchart illustrating example operation of an ingress PE router of a MPLS/BGP IP VPN to support PIM-DM mode traffic

FIG. 3 is a flowchart illustrating example operation of an ingress PE router of a MPLS/BGP IP VPN to support PIM-DM mode traffic. For exemplary purposes, FIG. 3 is described with respect to PE router 12A, although any of PE routers of FIG. 1 may implement the techniques. Initially, PE router 12A receives multicast data 27 in the form of PIM-DM traffic (40). That is, multicast data 27 is native multicast traffic associated with one or more multicast groups (S,G) for which no PIM multicast control signals (e.g., PIM join requests) have been previously signaled and, instead, is flooded within MVPN A site 18A as IP packets in accordance with PIM-DM.

Upon receiving multicast data 27, PE router 12A determines the source IP address and the associated multicast group <S,G> by examining the IP header of the packet carrying the multicast data (42). PE router 12A then determines whether a selective service provider tunnel has already been established through SP network 10 for forwarding multicast data the specific <S,G> and, if so, floods the multicast data 27 into the selective service provider tunnel in accordance with the underlying transport technology (e.g., MPLS P2MP LSPs) (44).

If no selective tunnel has already been established, the PE router determines whether a selective service provider tunnel has been defined for the multicast group <S,G> but not yet established (48) If so, since PE router 12A outputs advertisement 31 to advertise the formation of an SPMSI in the form required by the underlying transport technology (50), receives any necessary signaling response messages 33 from the egress PEs to establish the selective tunnel (52) and floods the multicast data 27 into the selective service provider tunnel in accordance with the underlying transport technology (54). As discussed above, all egress PE routers (e.g., PE router 12C) that are members of MVPN A are required to join the selective-PMSI advertised by ingress PE 12 for the PIM-DM group even though they likely have no PIM state for PIM join messages from their respective CE routers to which they connect.

If no selective service provider tunnel has been defined for the particular multicast group <S,G> associated with the PIM-DM multicast traffic 27 (or if no signaling response messages were received to the S-PMSI advertisement), PE router 12A determines whether an inclusive provider tunnel has been established for specific the MVPN (56). The inclusive provider tunnel may be a multidirectional inclusive PMSI (MI-PMSI) tunnel or a unidirectional inclusive PMSI (UI-PMSI) tunnel. If an inclusive provider tunnel has been established for MVPN A, PE router 12A floods multicast data 27 on the inclusive provider tunnel, such as inclusive provider tunnel 35 of FIG. 2 (58). If no inclusive provider tunnel has been defined for MVPN A, PE router 12A may attempt to automatically signal an inclusive provider tunnel for the MVPN or may drop the PIM-DM multicast traffic 27 (60).

All egress PE routers (e.g., PE routers 12B, 12C), upon receiving the PIM-DM multicast traffic 27 on the provider tunnel, forward the multicast traffic data on all of their CE interfaces that are configured in dense mode. In this way, PE routers 12 build a data path from the source 12 to receiving customer devices and thereby extend the PIM-DM domain over the service provider network 10 by way of the BGP/MPLS IP VPN without requiring express PIM join requests either within the customer sites or within the service provider network by way of BGP.

Figure 4:
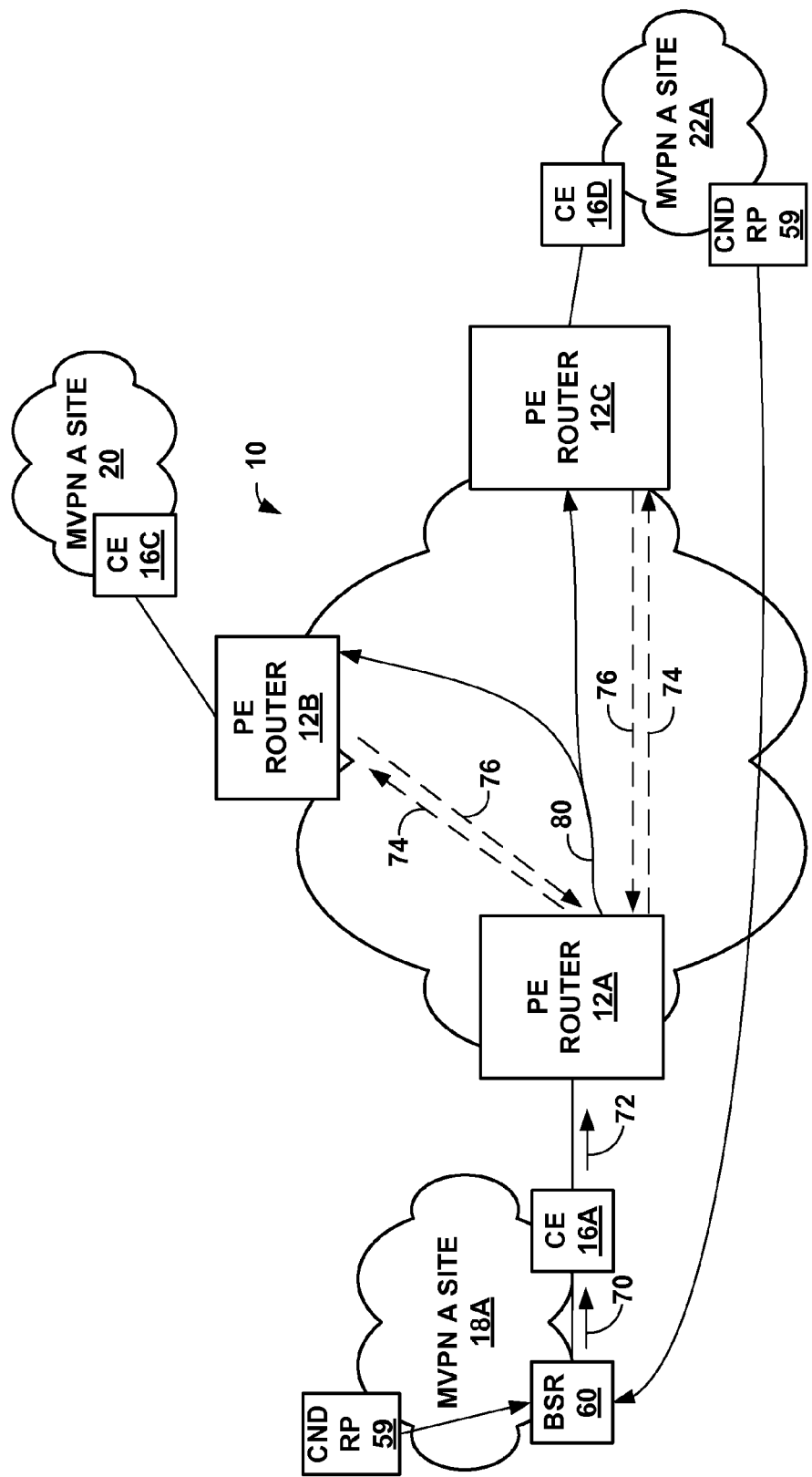
FIG. 4 is a block diagram illustrating a portion of the computer network of FIG. 1 in supporting PIM-Bootstrap Router (BSR) through the MPLS/BGP IP VPN of the service provider network.

FIG. 4 illustrates a portion of computer network 2 of FIG. 1 in supporting PIM-Bootstrap Router (BSR) through the MPLS/BGP IP VPN of the service provider network 10. PIM-BSR is a mechanism of the PIM multicast routing protocol that uses the concept of a Rendezvous Point as a means for multicast receivers to discover the multicast sources that send to a particular multicast group.

BSR messages are sent as PIM control messages on a hop-by-hop basis. The PIM-enabled routers process the PIM control messages to update their state of the rendezvous point, and flood BSR PIM control messages to their neighboring devices. These BSR PIM control messages are typically sent with a specific multicast broadcast address (224.0.0.13) and with a time-to-live (TTL) value of 1. Further details of BSR are described in RFC 5059, "Bootstrap Router (BSR) Mechanism for Protocol Independent Multicast (PIM)," Internet Engineering Task Force, January 2008, the entire contents of which are incorporated herein by reference.

As shown in FIG. 4, candidate rendezvous points (CND RP) 59 inform a Bootstrap router (BSR) 60 of their candidacy for operating as a rendezvous point by outputting unicast messages to BSR 60. Upon selecting a rendezvous point for the PIM domain, BSR 60 outputs Bootstrap messages (BSM) 70 in the form of PIM control messages to announce the selection. BSM 70 takes the form of IP packets in which the payload carries PIM control messages related to the BSR function. PIM-enabled routers of MVPN A site 18A, including CE router 16A, receive BSM 70 and process the messages with the PIM protocol executing on their control planes to update state data to reflect the selected rendezvous points. CE router 16A generates and outputs its own PIM bootstrap messages and floods BSMs 72 to its neighboring devices, including the link facing PE router 12A. PE router 12A utilizes the techniques described herein to extend support for BSR through MPLS/BGP VPN provided by service provider network 10.

Upon receiving BSM 72, PE router 12A processes the BSM with the PIM protocol in its control plane to update its BSR data with respect to the selected rendezvous points. Next, PE router 12A signals a dedicated selective service provider tunnel to carry the Bootstrap PIM control messages if a selective tunnel has been configured by the administrator for the PIM control message destination address. Specifically, PE router 12A outputs advertisements 74 within service provider network to initiate the establishment of selective tunnel 80 for transporting the BSMs.

In this way, transport of BSM is out of band with the transport of the multicast data for MVPN A. That is, the transport of BSM utilizes a separate, dedicated selective tunnel and not a tunnel that carries multicast data traffic for the MVPN. In one example, advertisements 74 initiates a selective provider multicast service interface (SPMSI) and specifies a special group address referred to as the "ALL-PIM-ROUTERS" address of 224.0.0.13. All other PE routers 12B, 12C in the MVPN A join the SPMSI advertised by ingress PE 12A for the special BSR group to receive the BSMs without any c-multicast control information for the group, i.e., without having received any c-multicast control messages from customer devices for the particular group. For example, even though PE router 12C may not have received any specific PIM join messages from CE 16D for the multicast group 224.0.0.13 being advertised, PE router 12C nevertheless joins the SPMSI being signaled by PE 12A by outputting any control plane signals 76 that are necessary to join the selective provider tunnel. The particular control plane signals 76 are a function of the underlying tunneling technology (e.g., P2MP LSPs) being used to transport the BSMs through the provider network 10. Similarly, all other PE routers that are members of MVPN A also automatically join the SMPSI being signaled for the special BSR group even though they may not have received any PIM join messages for the group from the CE routers of their site. Once the selective provider tunnel is established (e.g., 29A in FIG. 2), ingress PE router 12A outputs any bootstrap messages (BSMs) that it generated on the dedicated selective provider tunnel 80 which will be received by other PE routers in the MVPN. All egress PE routers (e.g., PE routers 12B, 12C), upon receiving the BSMs on the selective provider tunnel 80, process the BSMs with their control planes to update their PIM Bootstrap state and output BSMs on all of their CE-facing interfaces. Even though the SPMSI is established for the ALL-PIM-ROUTERS group, which can be used as destination for other PIM control messages, in one embodiment PE routers 12 send only BSR control packets on the selective provider tunnel 80. That is, in this embodiment PIM join requests and PIM hello messages, for example, are not forwarded between the PE routers 12.

Figure 5:
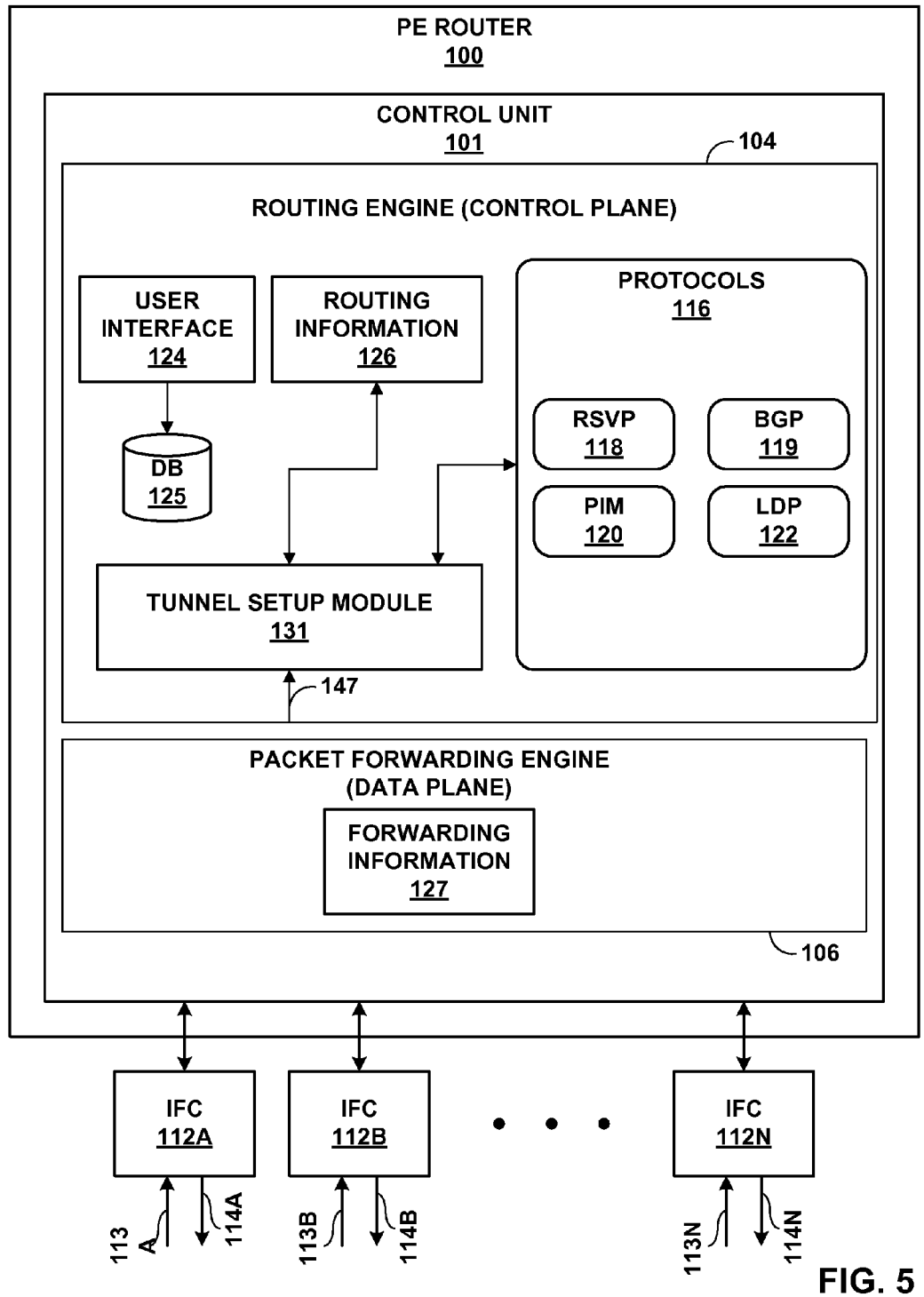
FIG. 5 is a block diagram illustrating an exemplary PE router capable of supporting PIM-DM and PIM-BSR over an MVPN in accordance with the techniques described herein.

FIG. 5 is a block diagram illustrating an exemplary PE router 100 capable of supporting one or more MVPNs in accordance with the techniques described herein. As one example, PE router 100 may comprise a PE router of a service provider network, and may act as an ingress and/or egress router as discussed herein. PE router 100 may operate substantially similar to any of PE routers 12 from FIGS. 1-4.

In this example, PE router 100 includes interface cards 112A-112N ("IFCs 112") that receive multicast packets via inbound links 113A-113N ("inbound links 113") and send multicast packets via outbound links 114A-114N ("outbound links 114"). IFCs 112 are typically coupled to links 113, 114 via a number of interface ports. Router 100 also includes a control unit 101 that determines routes of received packets and forwards the packets accordingly via IFCs 112.

Control unit 101 may comprise a routing engine 104 and a packet forwarding engine 106. Routing engine 36 operates as the control plane for router 100 and includes an operating system that provides a multi-tasking operating environment for execution of a number of concurrent processes. An example of such an operating system is FreeBSD, which is an advanced UNIX operating system that is compatible with a number of programmable processors, including processors commercially available.

Processes executing on the operating system may include a routing protocol process 116 that implements complex routing protocols and other functions. Routing protocol process 116 includes one or more threads that implement the various network protocols supported by routing engine 104. Routing protocols 116 may include, for example, threads that implement protocols, such as Border Gateway Protocol (BGP) 119, for exchanging routing information with other routing devices and for updating routing information 126. In the illustrated embodiment, protocols 36 include RSVP 118, BGP 119, PIM 120, and LDP 122. Routing information 126 may describe a topology of the service provider network 10, and may also include VPN routes learned for the MPLS/BGP IP VPN. Routing information 126 describes various routes within the network, and the appropriate next hops for each route, i.e., the neighboring devices of along each of the routes.

Routing engine 104 analyzes stored routing information 126 and generates forwarding information 127 for forwarding engine 106. Forwarding information 127 may associate, for example, network destinations with specific next hops and corresponding IFCs 112 and physical output ports for output links 114. Forwarding information 127 may be a radix tree programmed into dedicated forwarding chips, a series of tables, a complex database, a link list, a radix tree, a database, a flat file, or various other data structures.

In general, when router 100 receives a multicast packet via one of inbound links 113, control unit 101 determines a destination and associated next hop for the packet in accordance with routing information 126 and forwards the packet on one of outbound links 114 to the corresponding next hop in accordance with forwarding information 127 based on the destination of the packet.

A system administrator may specify configuration information for PE router 100 via a user interface 124 included within control unit 101. The configuration information may then be stored in database (DB) 125 coupled to user interface 124. User interface 124 may include a display, a keyboard, a mouse or another type of input device or may be presented on a remote management device, such as an SNMP-enable management device.

Control unit 101 also includes a tunnel setup module 131 for invoking any of protocols 116 to signal provider tunnels for carrying PIM-DM traffic as described herein. For example, tunnel setup module 131 is invoked upon receiving a trigger signal 147 from packet forwarding engine indicating that PIM-DM multicast traffic has been received for which not forwarding service provider tunnel has been programmed in forwarding information 127. Tunnel setup module 131 operates in accordance with the techniques shown above (e.g., the flowchart of FIG. 3) to control service provider tunnel selection and creation. For example, tunnel setup module 131 may access database 125 to determine whether the configuration data marks the source, group (<S,G>) as designated for a selective tunnel and, if so, invokes protocols 116 to establish a selective PMSI to carry the PIM-DM multicast traffic even though no c-multicast control message have been received for the group and, as such, there is no c-multicast state data for the group maintained by PIM protocol 120. Once the service provider tunnel has been signaled, routing engine 104 updates routing information 126 and installs forwarding details for the selective tunnel within forwarding information 127, thereby programming packet forwarding engine 106 to direct subsequently received PIM-DM multicast traffic for the group into the selective tunnel. In the event the inclusive tunnel is to be used, tunnel setup module 131 and routing engine 104 similarly programs forwarding information 127 to install forwarding details to direct the PIM-DM multicast traffic into the inclusive tunnel for the particular MVPN.

Similarly, tunnel setup module 131 may be invoked by PIM module 120 when outputting PIM Bootstrap Messages (BSMs). For example, PIM 120 processes BSMs received from packet forwarding engine 106 so as to update BSR state within the PIM protocol. As described above, PIM 120 outputs BSMs to be communicating to neighboring routers. At this time, PIM 120 may invoke tunnel setup module to signal a dedicated selective service provider tunnel to carry the Bootstrap PIM control messages (e.g., service provider tunnel 80 of FIG. 4).

In this example, PE router 100 supports various multicast data packet tunneling technologies for establishing service provider tunnels. Tunnel setup module 131 does not place any restrictions on the multicast technology used to set up provider tunnels across the network. For example, tunnel setup module 131 may use RSVP 118, PIM 40, or LDP 42 to establish multicast trees. In some cases, RSVP 118 may be extended to provide TE capabilities. As one example, tunnel setup module 131 may use RSVP 118 to instantiate a P2MP LSP as a multicast tree. As another example, tunnel setup module 131 may use PIM 40 to setup PIM/GRE tunnels forming a multicast tree in the core of the network. That is, control unit 101 may use IP/GRE (internet protocol/generic routing encapsulation) or MPLS to transport multicast data packets. Exemplary techniques for establishing P2MP LSPs as provider tunnels can be found in "Aggregate Multicast Trees for Multicast Virtual Private Networks," by Rahul Aggarwal and Yakov Rekhter, U.S. patent application Ser. No. 11/212,509, filed Aug. 26, 2005; "Multicast Data Trees For Multicast Virtual Private Networks," by Rahul Aggarwal, Yakov Rekhter and Anil Lohiya, U.S. patent application Ser. No. 11/212,500, filed Aug. 26, 2005; "Reliable Exchange Of Control Information For Multicast Virtual Private Networks," by Rahul Aggarwal, Yakov Rekhter and Anil, U.S. patent application Ser. No. 11/212, filed Aug. 26, 2005; "Transport of Control And Data Traffic For Multicast Virtual Private Networks," by Rahul Aggarwal, Yakov Rekhter and Anil Lohiya, U.S. patent application Ser. No. 11/213/636, filed Aug. 26, 2005; "Shared Multicast Trees For Multicast Virtual Private Networks," by Rahul Aggarwal and Yakov Rekhter, U.S. patent application Ser. No. 11/213,638, filed Aug. 26, 2005; and "Label Switching Multicast Trees For Multicast Virtual Private Networks," by Rahul Aggarwal, Yakov Rekhter and Anil Lohiya, U.S. patent application Ser. No. 11/212,475, filed Aug. 26, 2005, the entire contents of each being hereby incorporated by reference.

When operating as an egress device, upon receiving the PIM-DM traffic on the provider tunnel, packet forwarding engine of PE router 100 is programmed to forward the data on all interfaces to output links 114 that are configured in dense mode. For example, tunnel setup module 131 updates routing information 126 upon formation of and selective or inclusive service provider tunnel to carry PIM-DM traffic. Regardless of the c-multicast state within PIM 120 for the multicast groups, routing engine 104 programs forwarding information 127 to direct packet forwarding engine 106 to decapsulate the PIM-DM traffic from the provider tunnel and direct the PIM-DM traffic to all CE facing links.

The architecture of router 100 illustrated in FIG. 2 is shown for exemplary purposes only. The invention is not limited to this architecture. In other embodiments, router 100 may be configured in a variety of ways. In one embodiment, for example, some of the functionally of control unit 101 may be distributed within IFCs 112. In another embodiment, control unit 101 may comprise a plurality of packet forwarding engines operated as slave routers.

Control unit 101 may be implemented solely in software, or hardware, or may be implemented as a combination of software, hardware, or firmware. For example, control unit 101 may include one or more processors which execute software instructions. In that case, the various software modules of control unit 101 may comprise executable instructions stored on a computer-readable medium, such as computer memory or hard disk.

The techniques described herein may be used in supporting other PIM features in a MPLS/BGP IP VPN. For example, the techniques described herein may readily be applied to supporting PIM AUTO-RP (Rendezvous Point), which is a mechanism for discovering RPs in PIM-SM (Sparse Mode) environments. In this case, PIM AUTO-RP control messages are sent as PIM-DM traffic as locally generated traffic. PE routers may utilize the techniques described herein to accommodate the transport of the PIM AUTO-RP control messages as PIM-DM traffic through provider tunnels regardless of c-multicast state for the groups associated with the traffic, which in this case typically uses two group addresses of 224.0.1.39 and 224.0.1.40.

Various embodiments of the invention have been described. These and other embodiments are within the scope of the following claims.

The invention claimed is:

1. A method comprising:
   receiving multicast traffic with a first provider edge (PE) router of a service provider network, wherein the first PE router is connected to a first customer site and is a member of an Internet Protocol (IP) virtual private network (VPN) provided by the service provider network, and wherein the multicast traffic comprises PIM (Protocol Independent Multicast) Dense Mode (PIM-DM) traffic for which no PIM join control messages have been received by the first PE router;
   when the first PE router is configured to support the PIM-DM multicast traffic and a tunnel has not been established for the PIM-DM multicast traffic received by the first PE router, automatically signaling the tunnel to establish the tunnel to transport the PIM-DM multicast traffic through the provider network even though no PIM join control messages have been received by the first PE router;
   encapsulating the PIM-DM multicast traffic with the first PE router to form encapsulated packets; and
   forwarding the encapsulated packets with the tunnel to all other PE routers connected to the IP VPN.

2. The method of claim 1,
   wherein automatically signaling the tunnel comprises:
   determining a source network address and multicast group (<S,G>) for the PIM-DM multicast data traffic;
   determining whether the <S,G> for the PIM-DM multicast traffic has been designated for transport through the service provider network via a selective service provider tunnel; and when the <S,G> for the PIM-DM multicast traffic has been designated for transport through the service provider network via a selective tunnel and a selective service provider tunnel has not been established for the <S,G> of the PIM-DM traffic, automatically signaling a selective service provider tunnel through the provider network to transport the PIM-DM multicast traffic even though no PIM control messages have been received by the first PE router for the <S,G>, and wherein forwarding the PIM-DM multicast traffic comprises forwarding the PIM-DM multicast traffic through the service provider network with the selective service provider tunnel.

3. The method of claim 2,
wherein forwarding the PIM-DM multicast traffic comprises forwarding the PIM-DM multicast traffic through an inclusive service provider tunnel when the <S,G> for the PIM-DM multicast traffic has not been designated for transport through the service provider network via a selective service provider tunnel.

4. The method of claim 3, wherein the inclusive service provider tunnel comprises a multidirectional inclusive provider multicast service interface PMSI (MI-PMSI) tunnel or a unidirectional inclusive PMSI (UI-PMSI) tunnel.

5. The method of claim 1, further comprising programming a forwarding engine within the first PE router to forward the PIM-DM traffic as encapsulated packets for the network tunnel even though no PIM join messages have been received for a multicast group associated with the PIM-DM multicast traffic.

6. The method of claim 1, wherein automatically signaling the tunnel comprises signaling a Multiprotocol Label Switching (MPLS) point-to-multipoint (P2MP) label switched path (LSP).

7. The method of claim 1, further comprising:
receiving the encapsulated network packets with a second PE router, wherein the second PE router comprises an egress of the tunnel;
decapsulating the encapsulated network packets with the second PE router to extract the PIM-DM multicast data; and
flooding the PIM-DM multicast data to all interfaces of the second PE router that are connected to customer devices of a second site of the VPN.

8. The method of claim 1, wherein the PIM-DM multicast traffic comprises native multicast data output by a multicast source.

9. The method of claim 1, further comprising:
receiving first PIM Bootstrap Messages (PIM-BSMs) associated with discovery of a multicast group;
processing the first PIM-BSMs with a control plane of the first PE router to update state data associated with a PIM Bootstrap Router (PIM-BSR);
generating second PIM-BSMs with the control plane of the first PE router based on the updated state data associated with the PIM-BSR;
automatically signaling a selective service provider tunnel through the provider network to transport the second PIM-BSMs multicast traffic for the IP VPN if a selective service provider tunnel has been specified for an ALL-PIM-ROUTERS group; and
forwarding the second PIM-BSMs through the service provider network with the selective service provider tunnel.

10. A method of forwarding PIM (Protocol Independent Multicast) Dense Mode (PIM-DM) multicast traffic within an Internet Protocol (IP) VPN, the method comprising:

receiving multicast traffic with a first provider edge (PE) router of a service provider network, wherein the multicast traffic is PIM-DM multicast traffic associated with a multicast group for which no PIM join requests have been received by the first PE router;
determining a source network address and the multicast group (<S,G>) for the PIM-DM multicast data traffic;
determining whether the <S,G> for the PIM-DM multicast traffic has been designated for transport through the service provider network via a selective service provider tunnel;
when the <S,G> for the PIM-DM multicast traffic has been designated for transport through the service provider network via a selective tunnel and a selective service provider tunnel has not been established for the <S,G> of the PIM-DM traffic, automatically signaling a tunnel through the provider network to transport the PIM-DM multicast traffic even though no PIM control messages have been received by the first PE router for the <S,G> and forwarding the PIM-DM multicast traffic with the tunnel; and
when the <S,G> for the PIM-DM multicast traffic has not been designated for transport through the service provider network via a selective tunnel, forwarding the PIM-DM multicast traffic through an inclusive service provider tunnel.

11. A router comprising:
a set of input interfaces that receive multicast traffic from a first customer site of an Internet Protocol (IP) virtual private network (VPN), wherein the multicast traffic is PIM (Protocol Independent Multicast) Dense Mode (PIM-DM) traffic for which no PIM join requests have been received by the router from other provider edge (PE) routers within the IP VPN; and
a control unit having a processor executing a tunnel setup module,
wherein the tunnel setup module is configured to automatically signal a tunnel to establish the tunnel through a service provider network upon receiving the PIM-DM multicast traffic without having previously received multicast state data for a multicast group associated with the PIM-DM multicast traffic and a tunnel has not been established for the PIM-DM multicast traffic, and
wherein the control unit encapsulates the PIM-DM multicast traffic to form encapsulated packets and forwards the encapsulated packets within the tunnel to a second PE router connected to a second customer site of the VPN.

12. The router of claim 11, wherein the tunnel setup module is configured to determine a source network address and multicast group (<S,G>) for the PIM-DM multicast data traffic and automatically signal a selective service provider tunnel through the provider network to transport the PIM-DM multicast traffic even though no PIM control messages have been received by the first PE router for the source network address and multicast group.

13. The router of claim 12, wherein the control unit forwards the PIM-DM multicast traffic through the service provider network with the selective service provider tunnel.

14. The router of claim 11, further comprising:
wherein the control unit is configured to receive first PIM Bootstrap Messages (PIM-BSMs) associated with discovery of a multicast group and process the first PIM-BSMs to update state data associated with a PIM Bootstrap Router (PIM-BSR), wherein the control unit is configured to generate second PIM-BSMs based on the updated state data associated with the PIM-BSR, and wherein the control unit is configured to automatically signal a selective service provider tunnel through the provider network to transport the second PIM-BSMs multicast traffic for the IP VPN.

15. The router of claim 11, wherein the tunnel comprises an inclusive service provider tunnel.

16. The router of claim 11, wherein the IP VPN comprises a BGP/MPLS IP VPN.

17. The router of claim 11, wherein the tunnel comprises a MPLS point-to-multipoint (P2MP) label switched path (LSP) or an Internet Protocol/Generic Routing Encapsulation (IP-GRE) tunnel.

18. A system comprising:

a plurality of customer sites connected to a service provider network by a plurality of provider edge (PE) routers, wherein the PE routers provide a border gateway protocol/multiprotocol label switching Internet protocol virtual private network (BGP/MPLS IP VPN), wherein a first one of the PE routers receives multicast traffic from a first one of the customer sites, wherein the multicast traffic is PIM (Protocol Independent Multicast) Dense Mode (PIM-DM) traffic for which no PIM join messages have been received by the first PE router; and wherein the first one of the PE routers comprises a tunnel setup module configured to automatically signal a tunnel through the service provider network upon receiving the PIM-DM multicast traffic without maintaining multicast state data for a multicast group associated with the PIM-DM multicast traffic, wherein the first one of the PE routers encapsulates the PIM-DM multicast traffic to form encapsulated packets and forwards the encapsulated packets within the tunnel to a plurality of the other PE routers, and wherein the plurality of the other PE routers receive the encapsulated packets, decapsulate the encapsulated network packets with a second PE router to extract the PIM-DM multicast traffic, and flood the PIM-DM multicast traffic to all interfaces that are connected to customer sites of the VPN without maintaining state data for the multicast group associated with the PIM-DM multicast traffic.

* * * * *